United States Patent [19]
Hardy

[11] Patent Number: 6,000,647
[45] Date of Patent: Dec. 14, 1999

[54] IMPLEMENT FOR CLEANING CHICKEN HOUSES

[76] Inventor: Larry E. Hardy, P.O. Box 662, San Augustine, Tex. 75972

[21] Appl. No.: 09/120,221

[22] Filed: Jul. 21, 1998

[51] Int. Cl.⁶ .................................................. B02C 21/02
[52] U.S. Cl. .................................................. 241/101.763
[58] Field of Search ...................... 241/101.2, 101.763, 241/101.742; 119/442

[56] References Cited

U.S. PATENT DOCUMENTS

| | | |
|---|---|---|
| 3,662,420 | 5/1972 | Jordan, Jr. . |
| 3,721,214 | 3/1973 | Staples et al. . |
| 3,845,516 | 11/1974 | Abbott et al. ............................ 119/442 |
| 3,876,055 | 4/1975 | Tyznik . |
| 4,438,885 | 3/1984 | Martin . |
| 4,711,403 | 12/1987 | Gregory, Sr. et al. . |
| 4,897,183 | 1/1990 | Lewis, Jr. et al. . |
| 5,078,328 | 1/1992 | Willingham . |
| 5,143,309 | 9/1992 | Endom ............................. 241/101.763 |
| 5,297,745 | 3/1994 | Vinyard . |
| 5,740,763 | 4/1998 | Hollingsworth . |

*Primary Examiner*—Mark Rosenbaum
*Attorney, Agent, or Firm*—Akin, Gump, Strauss, Hauer & Feld, L.L.P.

[57] ABSTRACT

An attachment for use with litter removal machines such as are used in poultry houses. The attachment includes a blade that can be mounted on a litter removal machine to direct litter accumulated on poultry house floors near the walls into the path of the machine. The blade extends outwardly from one side of the machine at an angle between about 5° to 85° from the perpendicular in a direction away from the clean machine. Preferably, the blade is retractable such that when the cleaning machine is not being used to clean along the walls of a chicken house, the blade can be folded back along the side of the machine and locked into position then. The blade can have several elongated apertures for allowing the finer particles of litter to pass through the blade, while the caked and crusted litter is kept within the confines of the blade.

15 Claims, 3 Drawing Sheets

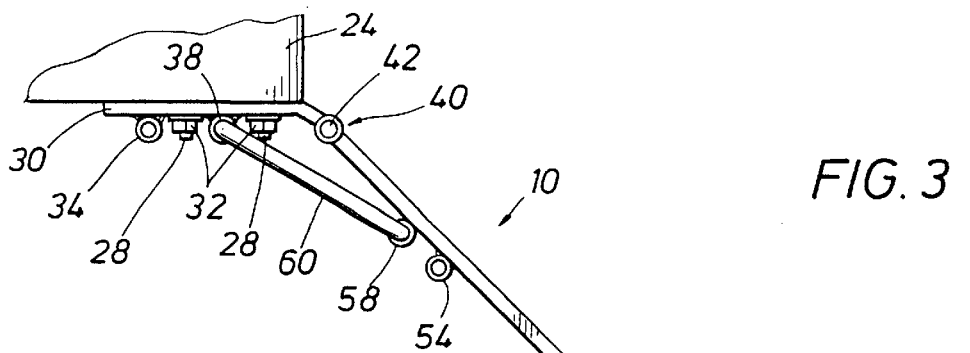
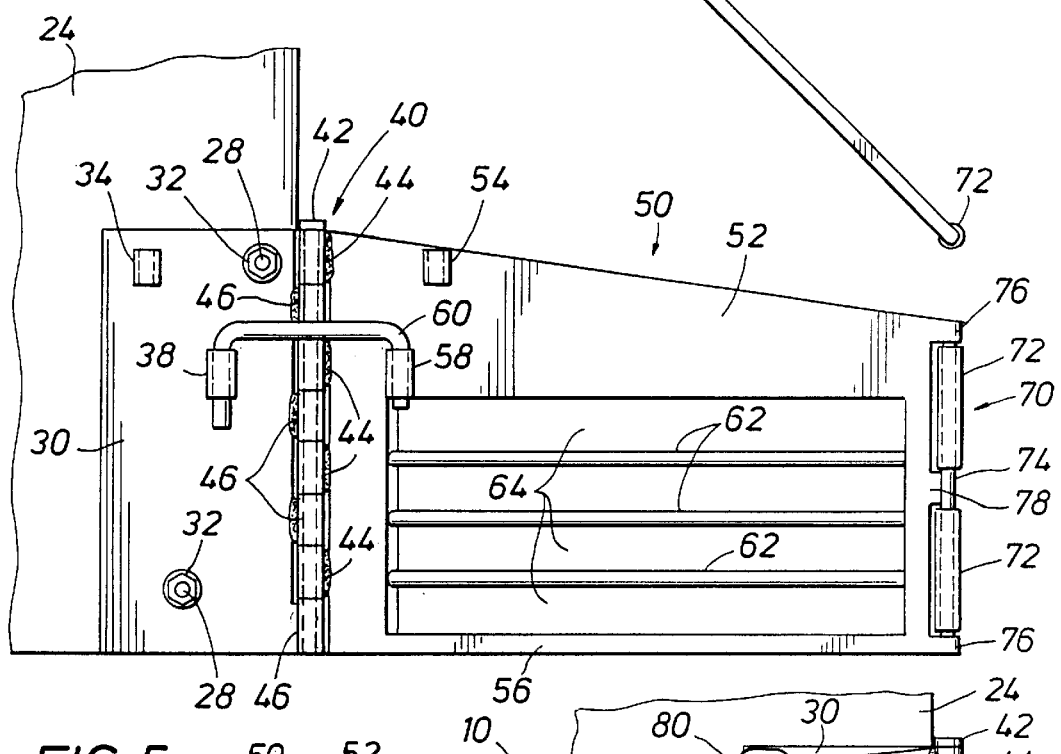
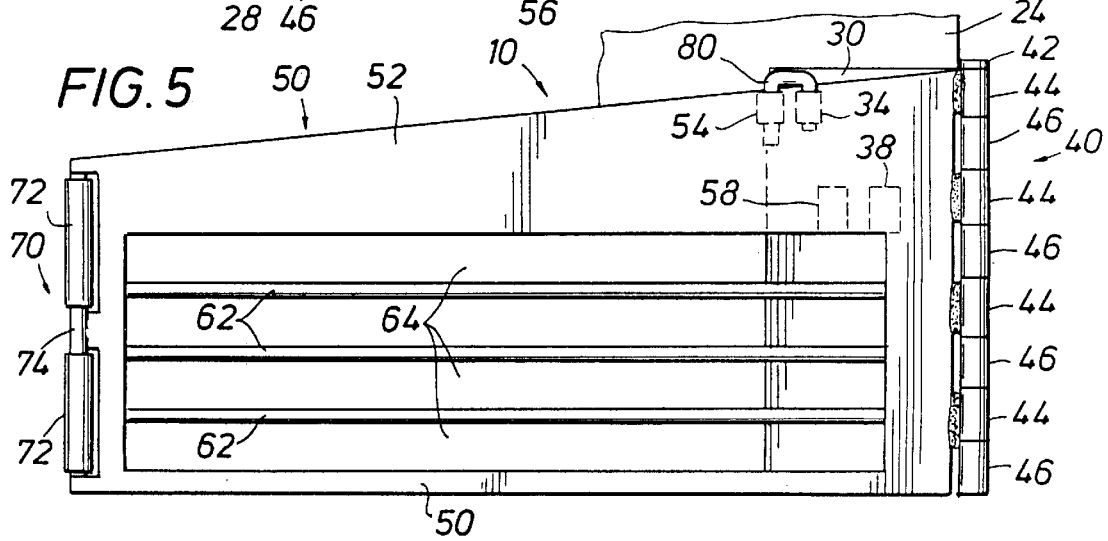

IMPLEMENT FOR CLEANING CHICKEN HOUSES

BACKGROUND OF THE INVENTION

1. Field of the Invention

The present invention relates to manure handling. More particularly, the present invention relates to apparatus and machines for clearing litter bases from the floor of poultry houses.

2. Description of the Related Art

Poultry is one of the most economic and nutritious meats available. One of the principal reasons that chicken is so economical is because chicken farmers and processors have a very orderly and organized production plan and program that is highly efficient.

Typically, chickens are raised by farmers who in turn have contracts with large poultry or broiler processors. Generally, small chickens are furnished to the farmer by a processor and the farmer manages the feeding and raising of the chickens from small chicks to appropriate broiler size. Ordinarily, the period of time for raising small chickens to a full grown broiler ready for processing is approximately seven (7) weeks.

One very important key in making broiler production profitable for both the farmer and the processor, and for keeping poultry costs relatively inexpensive, is to minimize the time the chicken house remains empty between flocks. Obviously, the more chickens that can be raised for a given time in a certain house, the more profitable the operation.

In the past, the real problem in providing a short turn-around time between flocks has been the inability to clean and ready the chicken house for the next flock in an expeditious manner. When raising chickens, chicken manure (called litter) falls onto the floor and collects throughout the chicken house. Much valuable time has traditionally been lost in cleaning the litter from the chicken house because it has ordinarily been done manually by hand and shovel. With labor often being in short supply and the nature of this particular job being what it is, this too has added to the difficulty of getting the chicken houses cleaned in a quick and efficient manner.

Traditionally, the cleaning of a chicken house resulted in the entire litter being disposed of. This is not a practical way to efficiently and cost effectively separate reusable litter from the caked manure and other materials when cleaning the chicken house using manual labor. Thus, under conventional practices all of the caked manure and associated litter were removed by hand. Thereafter, a new bed of litter or shavings was spread over the floor prior to a new flock of chickens being introduced into the house.

To address these problems, several efforts have been made to automatically clean chicken houses. These efforts have included machines that can pick up litter from the base of the chicken house and separate the hard crust or caked material, wet litter, feathers, and other trash from the finer particles of litter which can be reused. Typically, these automated machines are designed to be pulled or towed through the chicken house by a tractor. Examples of these machines for loading and separating litter bases are found in U.S. Pat. No. 4,897,183, U.S. Pat. No. 4,711,403, and U.S. Pat. No. 3,662,420. U.S. Pat. Nos. 4,897,183, 4,711,403 and 3,662,420 are hereby incorporated by reference for all purposes as if set forth herein in their entirety. Commercially available machines for picking up and separating litter include the Lewis Poultry Housekeeper, manufactured by Lewis Brothers Manufacturing, Inc. and the KMC Poultry House Cleaner available from Kelly Manufacturing Co.

While automated machines have been effective at cleaning the majority of the inside of chicken houses, they have not been successful at cleaning that portion of a chicken house floor immediately adjacent to the walls. Typically, the walls of a chicken house have fans mounted on the wall several feet above the chicken house floor. These fans and heaters protrude into the chicken house and prevent the automatic clean out machines from being pulled directly over the floor area next to the walls of the chicken house. As a result, there is generally a strip several feet wide along the walls on the chicken house floor that must be cleaned manually. Typically, this involves using manual laborers with pitch forks to go through and clean out the caked manure.

A typical chicken house is approximately 400 feet long and there are two sides that require manual cleaning. Generally, a small chicken farm has at least six of these large chicken houses. Since each of the chicken houses must be cleaned out approximately every seven weeks, the labor involved in just cleaning out along the inside walls of these chicken houses can be very expensive and time consuming which effects the ultimate efficiency of the chicken farm. It would be desirable to have an automatic clean out machine capable of cleaning chicken house floors along the interior side walls of the chicken houses. Further, it would be desirable to have an attachment, that could be added to existing machines to enhance their clean out ability to allow cleaning of chicken house floors along the interior sidewalls of chicken houses.

SUMMARY OF THE INVENTION

The present invention is an attachment for use with chicken house cleaning (or clean out) machines. Specifically, the present invention is an attachable blade that can be mounted on a clean out machine to direct litter accumulated on chicken house floors near the walls into the path of the clean out machine. When mounted, and in use, the blade extends outwardly from one side of the cleaning machine. The blade can be perpendicular to the side of the cleaning machine but preferably extends at an angle between about 5° to about 85° from the perpendicular in a direction toward the front of the cleaning machine. Preferably, the blade is retractable such that when the cleaning machine is not being used to clean along the walls of a chicken house, the blade can be folded back along the side of the machine and locked into position. The blade can have several elongated apertures for allowing the finer particles of litter to pass through the blade, while the caked and crusted litter is kept within the confines of the blade. When the floor along the walls of the chicken house needs to be cleaned, the blade can be unlocked and extended. The machine can then be pulled along, several feet from the inside walls, and the blade will capture and direct the excess litter in towards the path of the cleaning machine thereby cleaning that portion of the chicken house which has previously required extensive manual labor.

BRIEF DESCRIPTION OF THE DRAWINGS

A better understanding of the invention can be obtained when the detailed description set forth below is reviewed in conjunction with the accompanying drawings, in which:

FIG. 3 is a top view of an embodiment of the present invention shown in the extended position;

FIG. 4 is a rear view of the embodiment of the invention shown in FIG. 3;

FIG. 5 is a front view of the same embodiment of the invention depicted in FIG. 3, but shown in the retracted position;

DETAILED DESCRIPTION OF INVENTION

Figure 1:
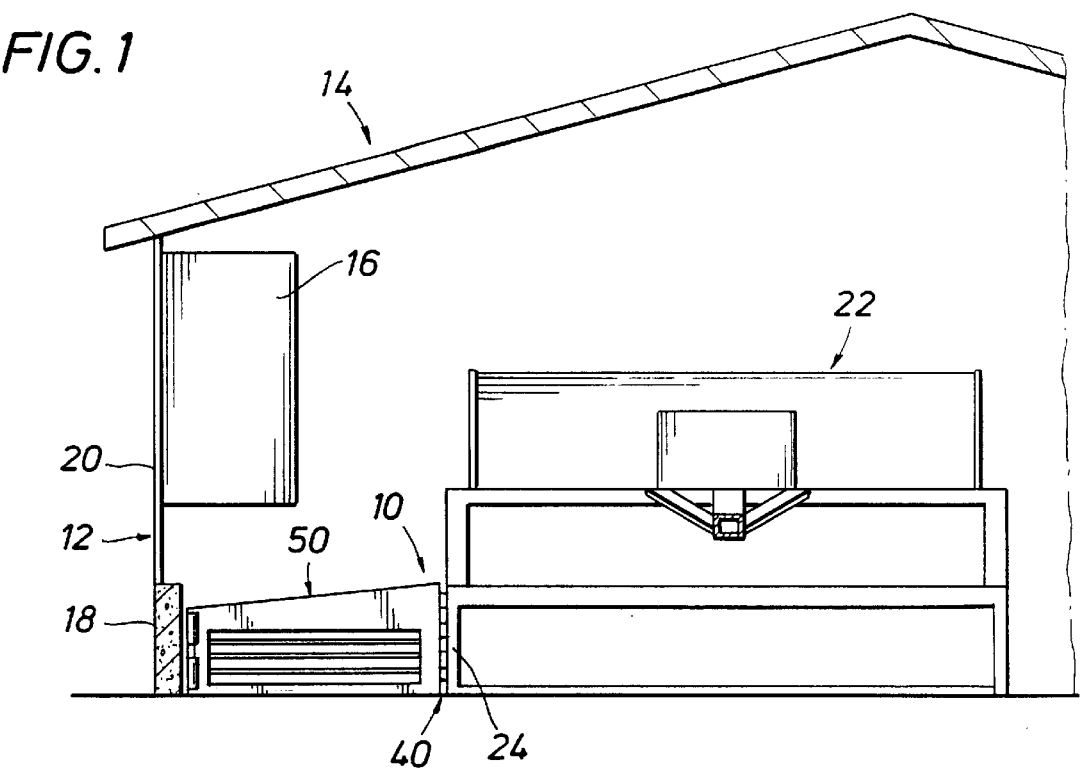
FIG. 1 is a frontal view of a clean out machine with an attachable blade according to the present invention depicted inside a chicken house.
Figure 2:
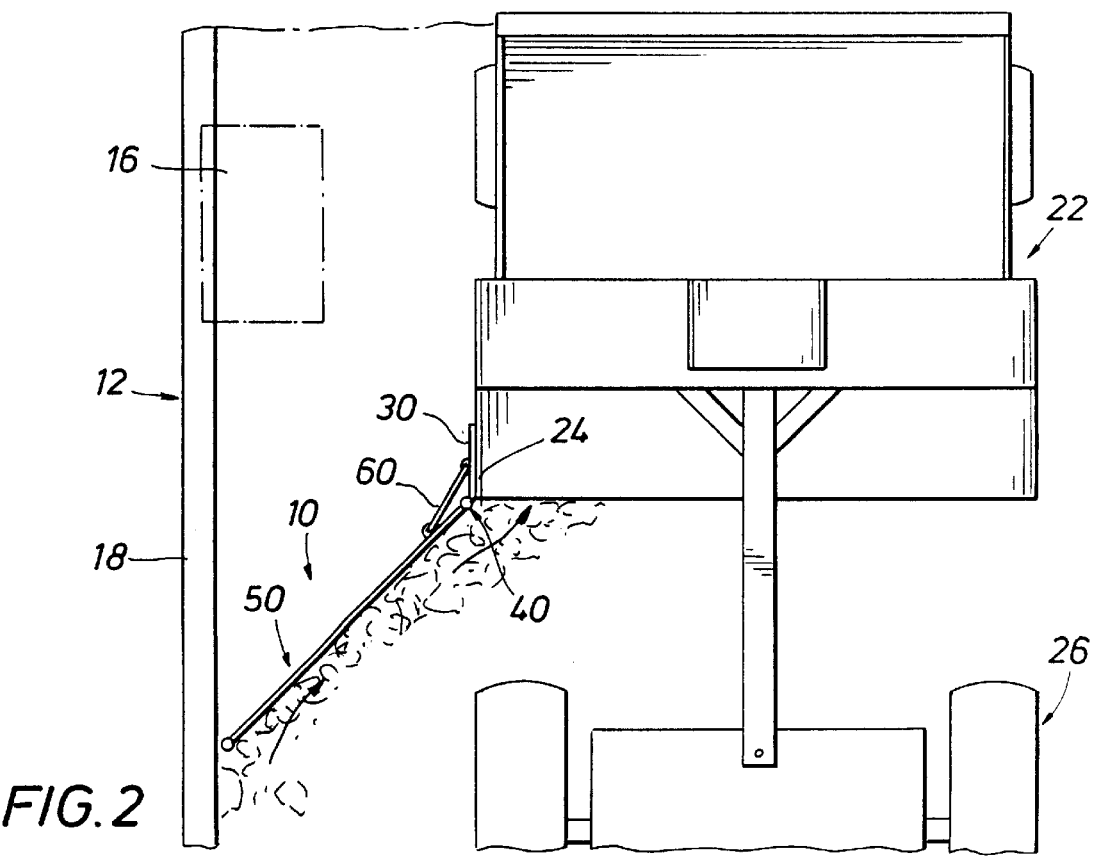
FIG. 2 is a top view of the clean out machine with an attachable blade according to the present invention of FIG. 1.

As shown in FIGS. 1 and 2, the present invention is an attachment 10 for a chicken house clean out machine 22 that enables the machine 22 to clean the floor along the base 18 of the wall 12 of a chicken house 14. Attachment 10 is mounted onto a structural frame member 24 of clean out machine 22. As can be seen, typical chicken house 14 has walls 12 including a base 18 and side panels 20. Often, fans 16 are mounted along wall 12 at a point along the wall panels 20 above base 18. Clean out machine 22 is pulled through chicken house 14 by tractor 26. However, fans 16 prevent clean out machine 22 from being pulled near to wall 12. Attachment 10 of the present invention, enables clean out machine 22 to capture the litter along the floor near wall 12 without coming in contact with fan 16.

Attachment 10 includes a mounting plate 30 for affixing attachment 10 to structural member 24 of clean out machine 22. Additionally, attachment 10 includes a blade 50, which extends outwardly from member 24 at an angle allowing litter to be captured and directed towards machine 22. A hinge 40 allows blade 50 to be extended for cleaning near walls and retracted when machine 22 is being used elsewhere or stored. A locking member 60 is provided for holding blade 50 in the extended position.

While the present invention is particularly useful to clean out chicken houses, the invention is equally applicable to clean houses and pens of other poultry or domesticated animals.

Referring to FIGS. 3 and 4, mounting plate 30 is affixed to structural member 24 to secure attachment 10 to cleaning machine 22. Attachment 10 can be designed to attach to either side of clean out machine 22. Mounting plate 30 can be attached to member 24 using bolts 28 which extend through member 24 and nuts 32 which are tightened onto bolts 28 to firmly secure mounting plate 30. Mounting plate 30 can also be attached by welding, clipping, or using other methods of fencing known to those skilled in the art. Preferably, mounting plate 30 is of a configuration that allows the use of bolts 28 and nuts 32 which are already present (original equipment) on clean out machine 22. The embodiment of the present invention shown in FIGS. 3 and 4 depicts a mounting plate 30 such as can be installed on the KMC Poultry House Cleaner manufactured by Kelly Manufacturing Co. to utilize the existing bolts 28 and nuts 32 on that machine. In this embodiment of the present invention, mounting plate 30 is a flat piece of plate with holes positioned on the plate to accommodate bolts 28 from machine 22. To install attachment 10, nuts 32 are removed from bolts 28. Mounting plate 30 is then placed over bolts 28 and positioned next to structural member 24. Nuts 32 are tightened over bolts 28 to secure mounting plate 30 in place.

As will be recognized by those skilled in the art, mounting plate 30 can have several different configurations, which depend upon the particular brand of clean out machine 22 with which attachment 10 will be used. For example, another commercially available clean out machine, the Lewis Poultry Housekeeper, manufactured by Lewis Brothers Manufacturing Co., requires a mounting plate 30 with an adapter portion that extends perpendicularly to mounting plate 30. The adapter has holes to accommodate original bolts and nuts along the structural member at the front of this particular commercial clean out machine. Other configurations of mounting plate 30 can be used with these or other clean out machines to accomplish the purpose of mounting attachment 10 within the scope of the present invention.

Blade 50 is attached to mounting plate 30 by hinge connection 40. Preferably, hinge connection 40 includes a series of tubular rings 46 which are spaced apart and permanently attached to mounting plate 30, a series of tubular rings 44 which are spaced part and permanently attached to blade 50, and a hinge pin 42. Rings 44 and 46 are spaced such that they can be interlocked and formed a continuous cavity in which hinge pin 42 can be inserted to form a pivot point that secures blade 50 to mounting plate 30 while allowing blade 50 to be rotated around hinge pin 42. Other forms and methods of hinges known to those skilled in the art can be used within the scope of the present invention.

Blade 50 includes a solid portion 52 with a series of elongated apertures 64. Preferably, blade 50 is manufactured from ⅜" steel plate. Apertures 64 allow finer particles of the litter to pass through blade 50 while rods 62 block larger caked litter and other materials and prevents them from passing through blade 50. As shown, rods 62 run horizontally and are connected to solid portion 52 of blade 50 to define individual apertures 64. As will be understood by those skilled in the art, rods 62 can be a variety of constructions including the round bars shown in FIGS. 3 and 4, as well as, metal strips or square bars, etc. Additionally, apertures 64 can be formed by punching or otherwise adding apertures to a solid blade 50 or by using other forms of perforated or expanded metal that allow the finer particles of litter to pass through while blocking the larger caked portions, in conjunction with the solid portion 52 of blade 50.

Blade 50 can also include a terminal end 70 that comprises a series of tubular bumpers 72 placed over a support bar 74. Support bar 74 is connected to solid portion 52 of blade 50 at end points 76 and 78.

When extended, blade 50 extends outwardly from cleaning machine 22 at an angle that allows the caked litter to be directed and moved towards cleaning machine 22 as machine 22 is pulled forward. Blade 50 may be positioned in a manner such that it extends directly perpendicular to support member 24. Preferably, blade 50 is positioned at an angle of between about 5° and about 85° from the perpendicular position toward the front of machine 22. More preferably, blade 50 is positioned at an angle of between about 25° and about 65° relative to the perpendicular.

Blade 50 is locked into the extended position by inserting locking member 60 into sockets 38 and 58. Sockets 38 and 58 are preferably tubular in shape. Socket 38 is externally secured to mounting plate 30. Socket 58 is externally secured to blade 50 at a position approximately even with socket 38. Locking member 60 is a U-shaped pin that can be simultaneously inserted into sockets 38 and 58 to secure blade 50 in the extended position. Locking member 60 and sockets 38 and 58 together form the means for holding blade 50 in the extended position. However, other means commonly known to those skilled in the art such as latches, locks, pins, etc. can be also used. Additionally, a chain can be attached to the front portion of machine 22 and to terminal end 70 of blade 50 to secure blade 50 in position.

When cleaning machine 22 is not being used to clean along the walls of a chicken house, blade 50 can be retracted or folded back adjacent to cleaning machine 22. To retract blade 50, locking member 60 is removed from sockets 38 and 58. Blade 50 is then manually pushed back adjacent to cleaning machine 22, where it is substantially parallel to mounting plate 30. As blade 50 is pushed backwards, it will pivot on hinge 40.

Figure 6:
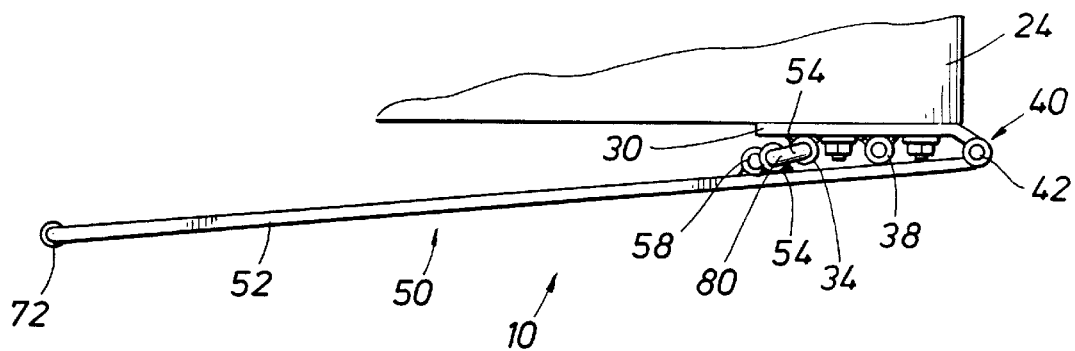
FIG. 6 is a top view of the embodiment shown in FIG. 5.

FIGS. 5 and 6 show apparatus 10 with blade 50 in the retracted position. Preferably, blade 50 is locked in the retracted position using locking pin 80 and sockets 34 and 54. Socket 34 is a tubular shaped socket attached to mounting plate 30. Socket 54 is also a tubular socket that is attached to blade 50 at a position substantially even with socket 34. When blade 50 is in the retracted position, sockets 34 and 54 are substantially adjacent to each other. Locking pin 80 is a U-shaped pin that can be simultaneously inserted into sockets 34 and 54 to lock blade 50 in the retracted position. Preferably, locking pin 80 is attached to cleaning machine 22 with a chain to prevent it from being misplaced.

Locking pin 80 and sockets 34 and 54 together form the means for holding blade 50 in the retracted position. However, other means commonly known to those skilled in the art for securing adjacent members such as latches, locks, pins, etc. can also be used.

Figure 7:
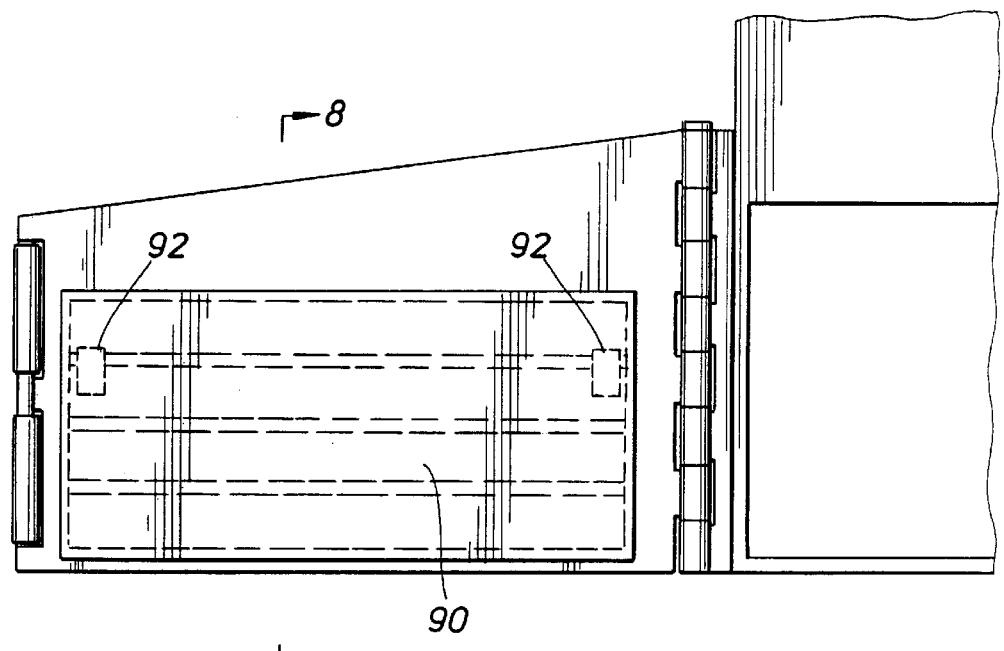
FIG. 7 is a front view of an embodiment of the present invention including a cover plate.
Figure 8:
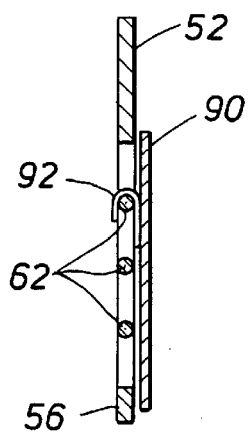
FIG. 8 is a cross section of the embodiment of the invention shown in the FIG. 7.

As shown in FIGS. 7 and 8, attachment 10 can also include a cover panel 90 for covering apertures 64 on blade 50. Panel 90 can be temporarily attached to blade 50 using hooks 92 which connect panel 90 with one or more rods 62. Various other means of attaching panel 90 can also be used. Panel 90 is attached to blade 50 when it is desired to remove the entire litter from a chicken house floor. Typically, the entire base of a chicken house is cleaned out at least once annually. Without panel 90, fine particles of litter pass through aperture 64. With panel 90 attached, these fine particles are blocked and are directed into cleaning machine 22 for removal.

As can now be understood, the present invention is an attachment for clean out machines that allows the machines to clean that portion of chicken house floors that are directly adjacent to the walls. The attachment is mounted onto any cleaning machine with a mounting plate. A blade is attached to the mounting plate by a hinge. The blade can be extended to direct litter into the path of the clean out machine when needed and can be retracted when not in use. As will now be recognized, the present invention overcomes the deficiency of the prior art clean out machine which left strips of litter near the walls of the chicken house requiring manual labor to complete the job.

The foregoing disclosure and description of the invention are illustrative and explanatory thereof, and various changes in the details of the illustrated apparatus and construction and method of operation may be made without departing from the spirit of the invention.

What is claimed is:

1. An improved litter screening and separating apparatus, wherein said apparatus has a scoop mechanism on a front portion thereof for scooping litter, a storage compartment for receiving and storing litter scooped up by the scoop mechanism, and an upwardly and rearwardly inclined conveyor extending from the scoop mechanism to the storage compartment for conveying litter, the improvement comprising:

a blade for directing litter outside the apparatus inwardly toward the scoop mechanism, said blade being in an extended position with a first end secured proximal to the scoop mechanism and a second end extending outwardly from the apparatus.

2. The apparatus of claim 1, wherein said blade is pivotally secured proximal to the scoop mechanism at the first end to allow said blade to be rotated from an extended position for use to a retracted position when not in use.

3. The apparatus of claim 2, wherein said blade is pivotally secured by a hinge interposed between and connecting said blade and the apparatus.

4. The apparatus of claim 3, wherein said hinge comprises tubular rings spaced apart and attached to said mounting plate, tubular rings spaced apart and attached to said blade, and a hinge pin.

5. The apparatus of claim 1, wherein said blade is removably secured proximal to the scoop mechanism.

6. The apparatus of claim 1, wherein said blade comprises solid portions and apertures.

7. The apparatus of claim 6, further comprising a cover plate.

8. The apparatus of claim 6, wherein said apertures are elongated apertures having a width substantially greater than the height of the apertures.

9. The apparatus of claim 1 further comprising a mounting plate for attaching said blade proximal to the scoop mechanism.

10. The apparatus of claim 1, wherein in an extended position, said blade extends outwardly from the apparatus at an angle between about 5° and 85° relative to a center line of the scoop mechanism.

11. The apparatus of claim 1, further comprising a locking means for securing said blade in an extended position.

12. The apparatus of claim 11, wherein said first locking means comprises a first socket attached to said mounting plate, a second socket attached to said blade, and a U-shaped pin.

13. The apparatus of claim 11, further comprising a second locking means for securing said blade in a retracted position.

14. The apparatus of claim 13, wherein said second locking means comprises a first socket attached to said mounting plate, a second socket attached to said blade, and a U-shaped pin.

15. The apparatus of claim 1, wherein said blade being between about two feet and about four feet in length between the first end and the second end.

* * * * *